US008858778B2

(12) United States Patent
Darling

(10) Patent No.: US 8,858,778 B2
(45) Date of Patent: Oct. 14, 2014

(54) METHOD FOR DNA DEFINED ETCHING OF A GRAPHENE NANOSTRUCTURE

(71) Applicant: Michael James Darling, Frazier Park, CA (US)

(72) Inventor: Michael James Darling, Frazier Park, CA (US)

(73) Assignee: Michael James Darling, Frazier Park, CA (US)

( * ) Notice: Subject to any disclaimer, the term of this patent is extended or adjusted under 35 U.S.C. 154(b) by 0 days.

(21) Appl. No.: 13/630,975

(22) Filed: Sep. 28, 2012

(65) Prior Publication Data
US 2013/0186772 A1 Jul. 25, 2013

Related U.S. Application Data

(60) Provisional application No. 61/588,556, filed on Jan. 19, 2012.

(51) Int. Cl.
*C25F 3/00* (2006.01)
*B82Y 40/00* (2011.01)

(52) U.S. Cl.
CPC ... *C25F 3/00* (2013.01); *B82Y 40/00* (2013.01)
USPC .......................................... 205/640

(58) Field of Classification Search
USPC ................................. 205/640–686
See application file for complete search history.

(56) References Cited

FOREIGN PATENT DOCUMENTS

WO    WO 2011/146090    11/2011

OTHER PUBLICATIONS

Dong et al., Electrical Detection of DNA Hybridization with Single-Base Specificity Using Transistors Based on CVD-Grown Graphene Sheets, Advanced Materials, 22, 1649-1653 (2010).*
Postma, Rapid Sequencing of Individual DNA Molecules in Graphene Nanogaps, 24th Annual CSU Biotechnology Symposium (Jan. 5-7, 2012), http://www.calstate.edu/csuperb/symposium/2012/.*
Zhou et al., Humidity Effects on Imaging and Nanomanipulation of Individual DNA Molecules on HOPG Surface, Chin. Phys. Lett., 24, 9, 2692-95 (2007).*
The International Searching Authority, Notification of Transmittal of the International Search Report and the Written Opinion of the International Searching Authority, Mar. 13, 2013, 2 pages, Korea.
The International Searching Authority, International Search Report, Mar. 13, 2013, 3 pages, Korea.
The International Searching Authority, Written Opinion of the International Searching Authority, Mar. 13, 2013, 3 pages, Korea.
Ma et al., Polyaniline Nanowires on Si Surfaces Fabricated with DNA Templates', Journal of the American Chemical Society, Jun. 8, 2004, pp. 7097-7101, vol. 126, No. 22.

(Continued)

*Primary Examiner* — James Lin
*Assistant Examiner* — Ho-Sung Chung
(74) *Attorney, Agent, or Firm* — K&L Gates LLP; Louis C. Cullman; Michelle Glasky Bergman

(57) ABSTRACT

The present invention provides a method for etching graphene using a DNA sample of a predetermined DNA shape. The DNA sample is preferably placed onto a reaction area of a piece of highly oriented pyrolytic graphite (HOPG), and both the DNA sample and HOPG are then preferably placed into a humidity-controlled chamber. Humidity is preferably applied to the HOPG to produce a film of water across the surface of the DNA sample. Electrical voltage is also applied to the HOPG to create potential energy for the etching process. After the etching is completed, the reaction area is typically rinsed with deionized water.

9 Claims, 6 Drawing Sheets

(56) References Cited

OTHER PUBLICATIONS

Sun et al., DNA-based Artificial Nanostructures: Fabrication, Properties, and Applications', Handbook of Nanostructured Biomaterials and Their Applications in Nanobiotechnology, 2005, pp. 224-246, vol 2.

Kim et al., Fabrication and Characterization of Large-Area, Semiconducting Nanoperforated Graphene Materials' Nano Letters, Apr. 14, 2010, pp. 1125-1131, vol. 10, No. 4.

* cited by examiner

METHOD FOR DNA DEFINED ETCHING OF A GRAPHENE NANOSTRUCTURE

Priority is claimed to U.S. Provisional Patent Application Ser. No. 61/588,556 filed Jan. 19, 2012, titled "DNA Defined Etching of Graphene," by inventor Michael James Darling, the contents of which are expressly incorporated herein by this reference.

FIELD OF THE INVENTION

This invention generally relates to a method for etching graphene. In particular, the invention is an etching method for graphene-based materials on a nanoscale by applying a voltage potential using DNA samples.

BACKGROUND OF THE INVENTION

Graphene has rapidly received significant attention since its discovery in 2004 due to its unique electrical, mechanical, and physical properties. Examples of such include low resistivity and high carrier mobilities. Researchers have discovered, for example, that electrons can travel substantially faster in graphene than in silicon by approximately one hundred times due to graphene's low resistivity. A single-atom-thick sheet of graphite, for instance, provides a resistivity of about 1.0 micro-Ohm per cm, which is approximately 35% less than the resistivity of copper, the previously lowest resistivity material known at room temperature. This low resistivity in graphene therefore provides higher conductivity for graphene-based applications, which is a big advantage for semiconductor applications that require rapid switching.

Regarding carrier mobility, graphene's limit to mobility of electrons also surpasses silicon. The limit of electron mobility in graphene is set by thermal vibration of the atoms and is approximately 200,000 $cm^2/Vs$ at room temperature. Silicon, on the other hand, is about 1400 $cm^2/Vs$. Because current graphene applications utilize only 10,000 $cm^2/Vs$, potential exists to maximize graphene-based applications to attain the 200,000 $cm^2/Vs$ limit.

Despite these advantages, graphene is usually constructed with channels having a nanoscale line width. Thus, to take advantage of these graphene-based applications, graphene fabrication generally requires the production of nanowires with a line width of approximately 1-2 nm in order to have a silicon band gap (i.e., approximately 1.11 eV). This causes problems because presently available semiconductor processing techniques make it impossible to cut graphene to such a narrow nanoscale line width, which is typically less than 3 nm. Additionally, conventional methods are much slower, requiring each point to be etched away by electrochemically reacting in a serial fashion. Further, these conventional methods typically rely on etching through a mask that has been fabricated using top-down lithography, which is known for preventing nanoscale resolution of patterns.

Therefore, what is needed is a new method for fabricating graphene at a nanoscale. The preferred method would be faster, utilizes a "bottom-up" approach, and uses DNA samples for etching.

SUMMARY OF THE INVENTION

To minimize the limitations in the prior art, and to minimize other limitations that will become apparent upon reading and understanding the present specification, the present invention discloses a method for etching graphene using DNA samples.

One embodiment of the present invention is a method for etching a graphene nanostructure, the steps comprising: providing a piece of highly oriented pyrolytic graphite; wherein the piece of highly oriented pyrolytic graphite has a first window, a second window, and a third window; wherein the first window and the second window include one or more electrode contacts configured to receive an electrical voltage; wherein a portion of the third window includes a reaction area configured to receive a DNA sample; depositing the DNA sample to the reaction area; placing the piece of highly oriented pyrolytic graphite in a humidity controlled chamber; applying a relative humidity to the piece of highly oriented pyrolytic graphite; and applying an electrical voltage across the first window and the second window. Preferably, the piece of highly oriented pyrolytic graphite is coated with a resist. Preferably, the first window, the second window, and the third window are etched by a scanning electron microscope using electron-beam lithography. The first window and the second window are typically positioned at approximately 600 to 1000 mirometers (mircometers or microns) apart, but are preferably positioned approximately 800 micrometers apart. The method for etching a graphene nanostructure may further comprise the step of: analyzing the first window, the second window, and the third window with an atomic force microscope. The method for etching a graphene nanostructure may further comprise the steps of: heating and melting the DNA sample and cooling the DNA sample to room temperature. The method for etching a graphene nanostructure may further comprise the step of diluting the DNA sample to a buffer solution. Typically, the buffer solution is approximately 0.5 to 1.5 molars of potassium chloride (preferably 1 molar); approximately 8 to 12 millimolars of tris(hydroxymethyl) aminomethane hydrochloride (preferably 10 millimolars); and approximately 8 to 12 millimolars of ethylenediaminetetraacetic acid (preferably 10 millimolars) (but any type of buffer solution may be used to provide ions for stabilizing the DNA sample due to the DNA sample's strong negative charge and its ability to fix the pH levels). Preferably, the electrical voltage is a voltage gradient of approximately 2 to 6 V/mm (preferably 4 V/mm) The DNA sample is preferably a double-stranded unmethylated lambda DNA. The method for etching a graphene nanostructure may further comprise the step of rinsing the DNA sample in warm deionized water.

Another embodiment of the present invention is a method for etching a graphene nanostructure, the steps comprising: providing a piece of highly oriented pyrolytic graphite; wherein the piece of highly oriented pyrolytic graphite has a first window, a second window, and a third window; wherein the first window and the second window include one or more electrode contacts configured to receive an applied voltage; wherein a portion of the third window includes a reaction area configured to receive a DNA sample; depositing the DNA sample to the reaction area; heating and melting the DNA sample; cooling the DNA sample to room temperature; diluting the DNA sample to a buffer solution; applying the buffer solution to the reaction area; incubating the reaction area; rinsing the reaction area with deionized water to remove the buffer solution and an excess of the DNA sample; placing the piece of highly oriented pyrolytic graphite in a humidity controlled chamber; applying a relative humidity to the piece of highly oriented pyrolytic graphite; applying an electrical voltage gradient across the first window and the second window for approximately one to two minutes; and rinsing the piece of highly oriented pyrolytic graphite in warm deionized water. Preferably, the first window; the second window; and the third window are etched by a scanning electron microscope using electron-beam lithography. Preferably, the method for etching a graphene nanostructure may further comprise the step of: analyzing the first window, the second window, and the third window with an atomic force microscope. The first window and the second window are preferably positioned approximately 600 to 1000 micrometers apart. Preferably, the DNA sample is a double-stranded unmethylated lambda DNA. The heating and melting step may be performed for approximately eight to twelve minutes (preferably eight minutes) at approximately 70 to 110° C. (preferably 90° C.) (but any amount of time may be used such as one minute to an hour). Preferably, the buffer is approximately 0.5 to 1.5 molars of potassium chloride; approximately 8 to 12 millimolars of tris(hydroxymethyl)aminomethane hydrochloride; and approximately 8 to 12 millimolars of ethylenediaminetetraacetic acid acid (but any type of buffer solution may be used to provide ions for stabilizing the DNA sample due to the DNA sample's strong negative charge and its ability to fix the pH levels). The applied relative humidity may be approximately 60 to 90%, but preferably 75% (but any amount of relative humidity (e.g., 0 to 100%) and/or temperature (e.g., 0 to 200° C.) may be used).

Another embodiment of the present invention is a method for etching a graphene nanostructure, the steps comprising: providing a piece of highly oriented pyrolytic graphite; wherein the piece of highly oriented pyrolytic graphite is coated with a polymethylmetaacrylate resist; wherein the piece of highly oriented pyrolytic graphite has a first window, a second window, and a third window; wherein the first window; the second window; and the third window are etched by a scanning electron microscope using electron-beam lithography; wherein the first window and the second window include one or more electrode contacts configured to receive an electrical voltage; wherein the first window and the second window are positioned approximately 600 to 1000 micrometers apart; analyzing the first window, the second window, and the third window with an atomic force microscope; wherein the first window and the second window include one or more electrodes configured to make electrical contact; wherein a portion of the third window includes a reaction area configured to receive a double-stranded unmethylated lambda DNA; depositing the double-stranded unmethylated lambda DNA to the reaction area; heating and melting the double-stranded unmethylated lambda DNA for approximately eight to twelve minutes at approximately 70 to 110° C. (but any amount of time may be used such as one minute to an hour); cooling the double-stranded unmethylated lambda DNA to room temperature; diluting the double-stranded unmethylated lambda DNA with a buffer solution; wherein the buffer solution is approximately 0.5 to 1.5 molars of potassium chloride; approximately 8 to 12 millimolars of tris(hydroxymethyl)aminomethane hydrochloride; and approximately 8 to 12 millimolars of ethylenediaminetetraacetic acid (but any type of buffer solution may be used to provide ions for stabilizing the DNA sample due to the DNA sample's strong negative charge and its ability to fix the pH levels); applying the buffer solution to the reaction area; incubating the reaction area for approximately twenty to forty seconds (preferably thirty seconds); rinsing the reaction area with a deionized water to remove the buffer solution and an excess DNA; analyzing the third window with the atomic force microscope; placing the piece of highly oriented pyrolytic graphite in a humidity controlled chamber; applying a relative humidity of approximately 60 to 90% to the piece of highly oriented pyrolytic graphite (but any amount of relative humidity (e.g., 0 to 100%) and/or temperature (e.g., 0 to 200° C.) may be used); applying an electrical voltage gradient of approximately 2 to 6 V/mm across the first window and the second window for approximately one to two minutes; and rinsing the piece of highly oriented pyrolytic graphite in warm deionized water.

It is an object of the present invention to provide a method for controlled etching of graphene based materials. The method or process preferably works on a nanometer scale in a matter of seconds under ambient conditions, but may also take up to several minutes or even one or more hours, and any amount of temperature may be applied such as 0 to 200° C.

It is an object of the present invention to provide a method for controlled etching of nanoscale graphene materials by using a bottom-up approach with the use of a self-assembled etch mask constructed of DNA samples.

It is an object of the present invention to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE DRAWINGS

Figure 1:
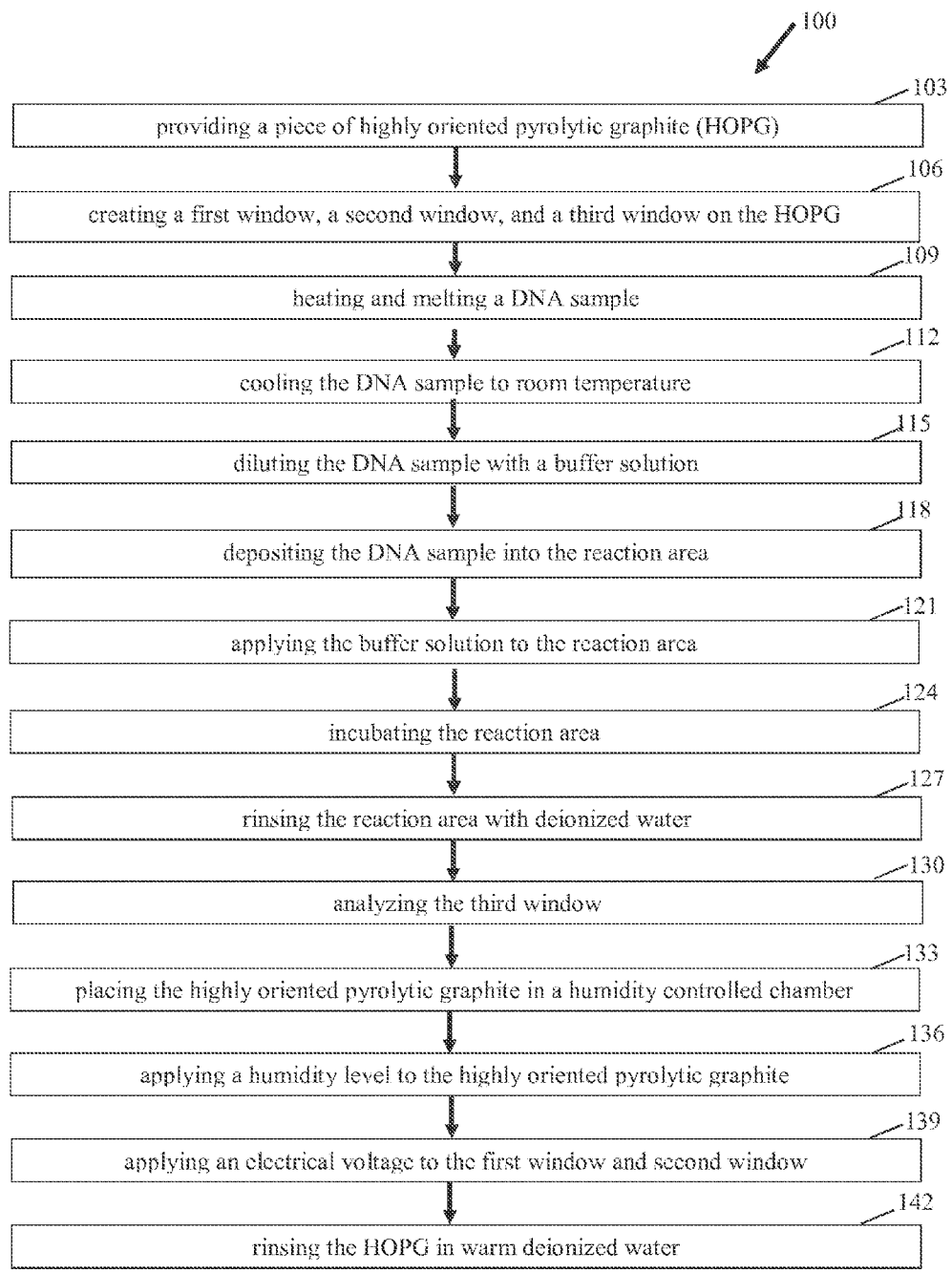
FIG. 1 is a block diagram of one embodiment of the method for etching a graphene nanostructure.

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the graphs, figures, and the detailed descriptions thereof, are to be regarded as illustrative in nature and not restrictive. Also, the reference or non-reference to a particular embodiment of the invention shall not be interpreted to limit the scope of the invention.

The method of the present invention etches graphene based materials using a DNA sample. Specifically, a DNA sample is typically placed on a reaction area of a piece of highly oriented pyrolytic graphite (HOPG), where both the DNA sample and HOPG are later placed in a humidity-controlled chamber. Humidity is generally applied to the HOPG and DNA sample to produce a water film, which typically forms across the surface of the DNA, but not on the surface of the HOPG. Electrical voltage is then preferably applied to the HOPG, thereby causing the voltage and water film to provide the potential energy for the etching process. Once the etching is completed, the reaction area may be rinsed with deionized water.

The application of humidity to the DNA sample with the HOPG is preferred because it typically provides the voltage potential for the etching process. For instance, a negatively-charged object placed in water containing both positive and negative ions generally acquires a screening layer that constitutes an electrochemical capacitance, which typically contains a first layer and second layer (i.e., double layer). The first layer of immobilized positive ions (i.e., the inner Helmholtz plane) forms near the negatively-charged surface of the DNA sample with a voltage potential generally increasing linearly up to that plane. On the other hand, negatively charged ions assemble at the second layer (i.e., the outer Helmholtz plane) with the voltage potential generally decreasing linearly up to that plane. A final layer, (i.e., the diffusive layer) forms, which typically connects the second layer (i.e., the outer Helmholtz plane) to the bulk of the water. This final layer generally has a voltage potential that exponentially tends to be zero.

In the present invention, however, unlike placing the entire HOPG in liquid or water, a thin water film is typically formed on the molecules of the DNA sample. Water film preferably forms on the DNA, but does not usually form on the graphene surface. This typically occurs because DNA is hydrophilic while the graphene surface is hydrophobic. As a result, the water film of the present invention provides a finite voltage, which is used as the voltage potential for the etching process. Although the use of humidity in the present invention may specifically refer to water, it should be understood that any vapor-like substance may be used to create the voltage potential (e.g., such as nitrogen vapor) without deviating from the scope of the invention.

In the following description, certain terminology is used to describe certain features of one or more embodiments of the invention. For instance, the terms "graphite" or "highly oriented pyrolytic graphite" ("HOPG") refers to graphite materials consisting of crystallites being highly aligned or oriented with respect to one other and having well-ordered carbon layers or a high degree of preferred crystallite orientation and also even refers to any single layer or multiple layers of graphene, including without limitation, thermal pyrolytic graphite and annealed pyrolytic graphite. The term "graphene" or "graphene film" denotes the atom-thick carbon sheets or layers that stack up to form "cleavable" layers (or mica-like cleavings) in graphite. The term "DNA samples" refers to any manufactured and/or programmable shape constructed from deoxyribonucleic acid used for the graphene etching process, including without limitation, double-stranded unmethylated lambda DNA.

FIG. 1 is a block diagram of one embodiment of the method for etching a graphene nanostructure. As shown in FIG. 1, the method for etching a graphene nanostructure 100 preferably comprises the steps of: providing a piece of highly oriented pyrolytic graphite 103; creating a first window, a second window, and a third window on the highly oriented pyrolytic graphite 106; heating and melting a DNA sample 109; cooling the DNA sample to room temperature 112; diluting the DNA sample with a buffer solution 115; depositing the DNA sample into the reaction area 118; applying the buffer solution to the reaction area 121; incubating the reaction area 124; rinsing the reaction area with deionized water 127; analyzing the third window 130; applying an electrical voltage to the first window and second window 139 and rinsing the HOPG in warm deionized water 142. It should be understood that the method 100 may omit certain steps and include other steps as well.

FIG. 1 shows the first step of the method for etching a graphene nanostructure 100, which is to provide a piece of highly oriented pyrolytic graphite 103. Highly oriented pyrolytic graphite (HOPG) 205 (shown in FIG. 2) is generally a bulk material consisting of many graphene layers with an exposed surface of graphite being a model graphene surface on a graphite substrate, but may also refer to a single layer or multiple layers of graphene. Preferably, the HOPG 205 is spin coated with an electron beam resist. The resist is typically a thin layer used to transfer a circuit pattern to the semiconductor substrate, and is also preferably polymethylmetaacrylate (PMMA). While HOPG 205 is the primary material used for the present invention, it is understood that any type of graphite may be used such as thermal pyrolytic graphite and annealed pyrolytic graphite.

FIG. 1 shows the next step of one embodiment of the method for etching a graphene nanostructure 100—i.e., creating a first window 220, a second window 225, and a third window 230 on the highly oriented pyrolytic graphite 106. Preferably, the creation of a first window 220, second window 225, and third window 230 is performed by utilizing electron-beam lithograpy on the HOPG 205 with a scanning electron microscope. Specifically, the scanning electron microscope should emit a beam of electrons in a patterned fashion across the HOPG surface to create three windows, which are preferably substantially square or rectangular in shape. It should be understood, however, that the three windows may be in any shape or form such as circles, triangles, octogons, and/or hexagons. Additionally, it should also be understood that the present invention does not require the use of windows and, alternatively, may allow the creation of any number of windows such as four, five, and six. Preferably, the electron-beam lithography selectively removes either exposed or non-exposed regions of the resist. This is typically accomplished to create very small structures in the resist that can be subsequently transferred to the substrate material by the etching process. It is important to note, however, that the present invention does not require the use of resist on the HOPG. Additionally, the first window 220 is typically spaced apart from the second window 225 approximately 600 to 1000 micrometers apart, but is preferably spaced apart by 800 micrometers. Once the three windows are created, the windows may be cleansed with isopropyl alcohol and blown dry. It is preferred that the windows be imaged with an atomic force microscope to ascertain their cleanliness. It is also preferred that the first window 220 and second window 225 are configured to make electrical contact while the third window 230 is be used as a reaction area.

FIG. 1 also illustrates the third and fourth steps of one embodiment of the method for etching a graphene nanostructure 100, which are: heating and melting the DNA sample 109 and cooling the DNA sample to room temperature 112. A DNA sample, which is typically a double-stranded unmethylated lambda DNA, is preferably heated and melted in order to prepare the patterned DNA in a pattern configuration. The DNA sample is generally heated, melted, and cooled in order to separate the double strand of the DNA sample and to create one or more sections of the single stranded DNA. Although the double-stranded DNA generally has poor adhesion to the graphene, the single stranded DNA usually has high adhesion to the graphene surface. Additionally, while this embodiment utilizes a double-stranded unmethylated lambda DNA, other types of DNA may be used.

The heating and melting process is typically performed by placing the DNA sample in a heat controlled chamber. The DNA sample also is generally melted when the DNA sample is heated for eight to twelve minutes at approximately 70 to 110° C. (preferably 90° C.). However, it should be understood, that the DNA sample may be melted by any method or means and may take up any duration of time and temperature. After the melting step is accomplished, the DNA sample is typically cooled down to room temperature.

FIG. 1 also shows the fifth and sixth steps of one embodiment of the method for etching a graphene nanostructure 100, which is: diluting the DNA sample with a buffer solution 115 and depositing the DNA shape into the reaction area 118. Specifically, when the HOPG 205 (along with the DNA sample) is cooled down to room temperature, the DNA sample is usually diluted into a buffer solution. The buffer solution is typically any aqueous solution that reduces the change of pH upon addition of small amounts of acid or base. For example, the buffer solution of one embodiment of the present invention typically consists of approximately 0.5 to 1.5 molars of potassium chloride (preferably 1 molar of potassium chloride); approximately 8 to 12 millimolars of tris(hydroxymethyl)aminomethane hydrochloride (preferably 10 millimolars of tris(hydroxymethyl)aminomethane); and approximately 8 to 12 millimolars of ethylenediaminetetraacetic acid (preferably 10 millimolars of ethylenediaminetetraacetic acid). However, it should be understood that any type of buffer solution may be used. Once the DNA sample is diluted with the buffer solution, the DNA sample is preferably deposited into the reaction area of the HOPG.

FIG. 1 also shows the next four steps of one embodiment of the method for etching a graphene nanostructure 100, which are: applying the buffer solution to the reaction area 121; incubating the reaction area 124; rinsing the reaction area with deionized water 127; and analyzing the third window 130. Specifically, the buffer solution is preferably applied to the reaction area and typically allowed to incubate. The incubation period may be between twenty to forty seconds (preferably thirty seconds), but any length of time may be used such as one minute or half an hour. After the expiration of the incubation period, the reaction area is preferably rinsed with deionized water to assist in removing the buffer solution and any excess DNA. Preferably, the reaction area is imaged to ascertain its cleanliness.

The eleventh and twelfth steps of the method for etching a graphene nanostructure 100 are placing the highly oriented pyrolytic graphite in a humidity controlled chamber 133 and applying a relative humidity to the highly oriented pyrolytic graphite 136. Specifically, after analyzing the third window 130 for any excess DNA and/or buffer solution, the HOPG 205 is preferably placed into a humidity-controlled chamber. A pre-determined relative humidity is generally applied to the HOPG 205, thereby typically resulting with the formation of a thin water film. It is preferred that the relative humidity is 70%, but any level of relative humidity such as 0 to 100% may be applied. Additionally, any temperature such as 0 to 200° C. may be used, especially since any type of polar vapor may form on the DNA sample/HOPG.

FIG. 1 also shows the last two steps of the method for etching a graphene nanostructure 100, which is applying an electrical voltage to the first window and second window 139 and rinsing the HOPG in warm deionized water 142. When the HOPG 205 is placed in the humidity controlled chamber, two electrical leads 210, 215 (shown in FIG. 2) typically contact the first window 220 and second window 225, respectively of the HOPG 205. Preferably, an electrical voltage of approximately between 5 to 15V is applied to the HOPG 205 (preferably 10V) with an applied voltage gradient of approximately 2 to 6 V/mm (preferably 4 V/mm) However, it should be understood that any voltage may be applied to the HOPG 205 without deviating from the scope of the invention. Once the etching period is completed, the HOPG 205 may be rinsed in warm deionized water. The etching period preferably lasts for approximately one minute but any time duration may be used for etching. Additionally, the rinsing period preferably lasts for approximately twenty minutes, but any time duration may be used for rinsing.

Figure 2:
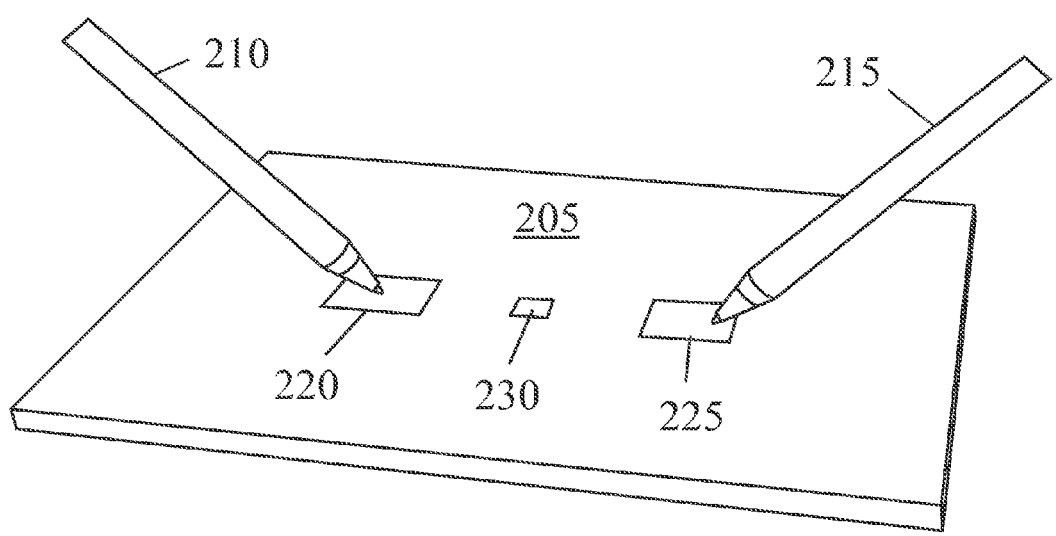
FIG. 2 is an illustration of one embodiment of the method for etching a graphene nanostructure and shows electrical leads positioned above the first window and second window of the highly oriented pyrolytic graphite.

FIG. 2 is an illustration of one embodiment of the method for etching a graphene nanostructure and shows electrical leads positioned above the first window and second window of the highly oriented pyrolytic graphite. As shown in FIG. 2, one embodiment of the method for etching a graphene nanostructure 100 preferably includes: the highly oriented pyrolytic graphite (HOPG) 205 and electrical leads 210, 215. The electrical leads 210, 215 are preferably any conducting mechanism that provides an electrical voltage to the HOPG 205. The electrical leads 210, 215 preferably contact the HOPG 205 after the HOPG 205 is placed in the humidity controlled chamber. However, the electrical leads 210, 215 may also provide electrical contact prior to placing the HOPG 205 into the humidity controlled chamber. The electrical leads 210, 215 typically provide an electrical power supply of approximately 10V, but may supply other various voltages as well such as 5 to 25V. The electrical lead 210 preferably provides a ground to the first window 220 while electrical lead 215 supplies the positive voltage charge (e.g., 10V) to the second window 225. It should be understood, however that electrical lead 210 may provide a positive voltage charge, whereas electrical lead 215 may provide ground. Furthermore, electrical lead 210, which generally provides ground, preferably includes a resistor connected in-between ground and the HOPG. Although an 8.9 ohm resistor for a 10V power supply is typically used, any type of resistor may be connected to ground.

Moreover, as discussed above, the HOPG 205 preferably includes a first window 220, second window 225, and third window 230. The first window 220 preferably includes one or more electrode contacts configured to provide conductance and is preferably connected to an electrical lead 210. Similarly, the second window 225 likewise preferably includes one or more electrode contacts and is also preferably connected to another electrical lead 215. It is important to note that, although the present invention recites the use of electrodes, electrodes may not be required for the present invention, as any conducting sublayer may be positioned beneath one or more layers of graphene, as this may be a preferred method for the manufacturing process.

Additionally, while FIG. 2 shows electrical lead 210 contacting the first window 220 and electrical lead 215 contacting the second window 225, it should be understood that electrical lead 215 may contact the first window 220 and electrical lead 210 may contact the second window 225. Additionally, while FIG. 2 shows the third window 230 in-between the first window 220 and second window 225, the third window 230 may be positioned anywhere on the HOPG such as left or right of the first window 220 and/or second window 225. As discussed above, the first window 220 and second window 225 are preferably spaced apart at approximately 600 to 1000 micrometer, but may be separated by any distance. The third window 230 preferably includes a reaction area, and is preferably the location where the DNA sample is inserted.

Figure 3:
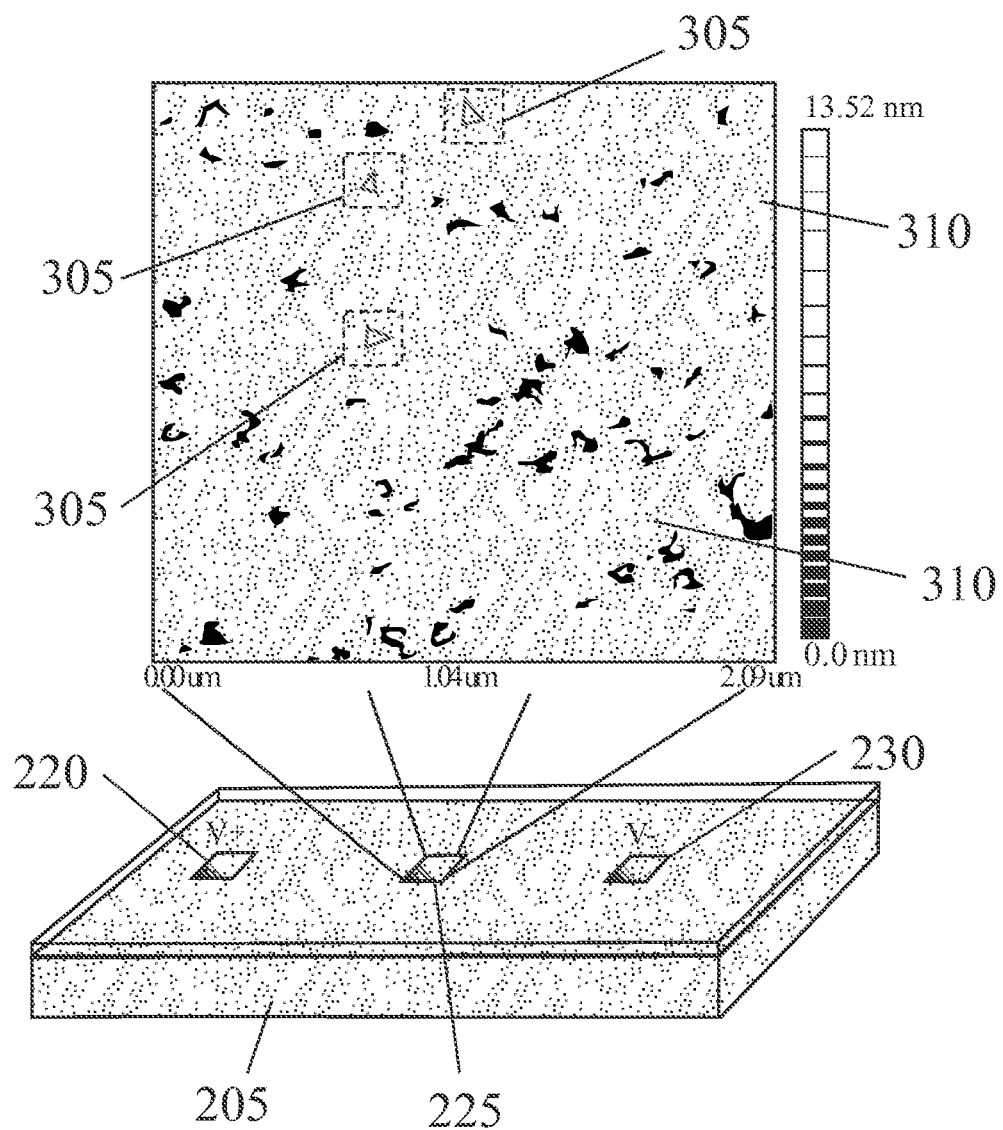
FIG. 3 is an illustration of one embodiment of the method for etching a graphene nanostructure and shows a detailed view of the reaction area of the third window after voltage and a relative humidity is applied to the reaction area.

FIG. 3 is an illustration of one embodiment of the method for etching a graphene nanostructure and shows a detailed view of the reaction area of the third window after voltage and a relative humidity is applied to the reaction area. As shown in FIG. 3, one embodiment of the HOPG 205 of the method 100 for etching a graphene nanostructure preferably includes: a first window 220, second window 225, and third window 230. The reaction area of the third window 230 may include one or more areas where etching has occurred 305, and one or more portions of excess DNA 310, which have not been washed off or removed. For purposes of FIG. 3, the areas where etching has occurred 305 may be represented by the triangular shapes, and the portions of excess DNA may be approximately 14 nanometers in thickness. The present invention, however, allows the etching of any shape or form such as circles, squares, and straight lines, and portions of excess DNA may be of any thickness such as approximately 8 to 12 nanometers.

Figure 4:
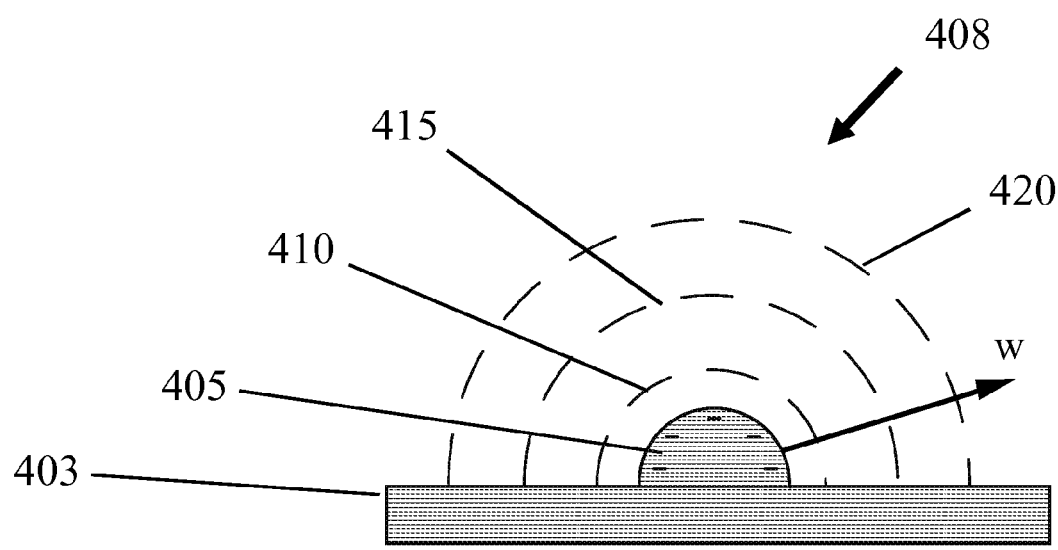
FIG. 4 is a schematic of a graphene surface with a DNA sample of one embodiment of the method for etching a graphene nanostructure and shows a double layer formation when humidity is applied to the highly oriented pyrolytic graphite.

FIG. 4 is a schematic of a graphene surface with a DNA sample of one embodiment of the method for etching a graphene nanostructure and shows a double layer formation when humidity is applied to the highly oriented pyrolytic graphite. As shown in FIG. 4, the surface of one embodiment of the method 100 for etching a graphene nanostructure preferably includes: a graphene surface 403; negatively charged DNA sample 405; and double layer 408. The graphene surface 403 is preferably the surface area of the HOPG, but may be the surface of any metal or material. The negatively charged DNA sample 405 is preferably the DNA sample that is charged with one or more electrically charged atom or group of atoms. The double layer 408 or electrical double layer is generally a structure that appears on the surface of an object when it is placed into a liquid and typically refers to the three significant films of water surrounding the charged object. The double layer 408 preferably includes an inner Helmholtz plane 410, outer Helmholtz plane 415, and diffusive region 420. The inner Helmoltz plane 410 is preferably the inner layer or surface plane that contains a layer of partially dissolved ions near the graphene surface 403. The outer Helmoltz plane 415 is preferably a plane of fully dissolved ions that resides above the inner layer and is typically composed of ions attracted to the surface charge via the coulomb force, electrically screening the inner Helmoltz plane 410. The diffusive layer 420 preferably is the region that resides outside both the Helmoltz plane 410 and outer Helmoltz plane 415 and generally connects to the bulk of the liquid. The symbol w preferably represents the distance from the negatively charged DNA sample 405 and is preferably represented herein in nanometers.

Figure 6:
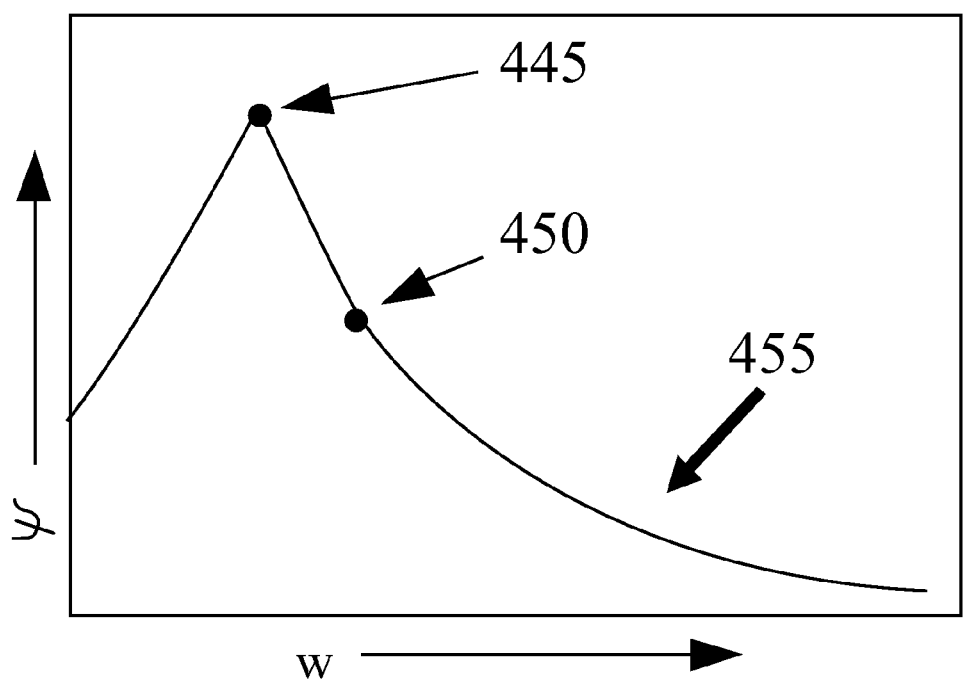
FIG. 6 is a graph of one embodiment of the method for etching a graphene nanostructure and shows the thickness of a water film with respect to a voltage potential.

In general, a negatively charged object that is placed in water containing both positive and negative ions acquires a screening layer that constitutes an electrochemical capacitance. This electrochemical capacitance of the double layer 408 is typically large, and the carbon nanotubes (which usually have a size comparable to DNA) can be utilized effectively for gating purposes. A layer of immobilized positive ions forms near towards the inner Helmholtz plane 410 and the voltage generally increases linearly up to that plane, as shown in FIG. 6. Negatively charged ions, on the other hand, usually assemble at the outer Helmholtz plane 415 and the voltage potential generally decreases linearly up to that plane. The negatively charged ions in this layer also preferably contribute to ionic conductance. At the diffusive layer 420, which connects the outer Helmoltz plane 415 to the bulk of the water, the voltage potential exponentially tends to be zero. However, because the present invention usually tends to create water films that are exceedingly thin, the bulk limit is typically never attained, and, as a result, a finite voltage difference usually exists across the water film. This finite voltage is preferably the potential that provides the energy for the etching process.

Figure 5:
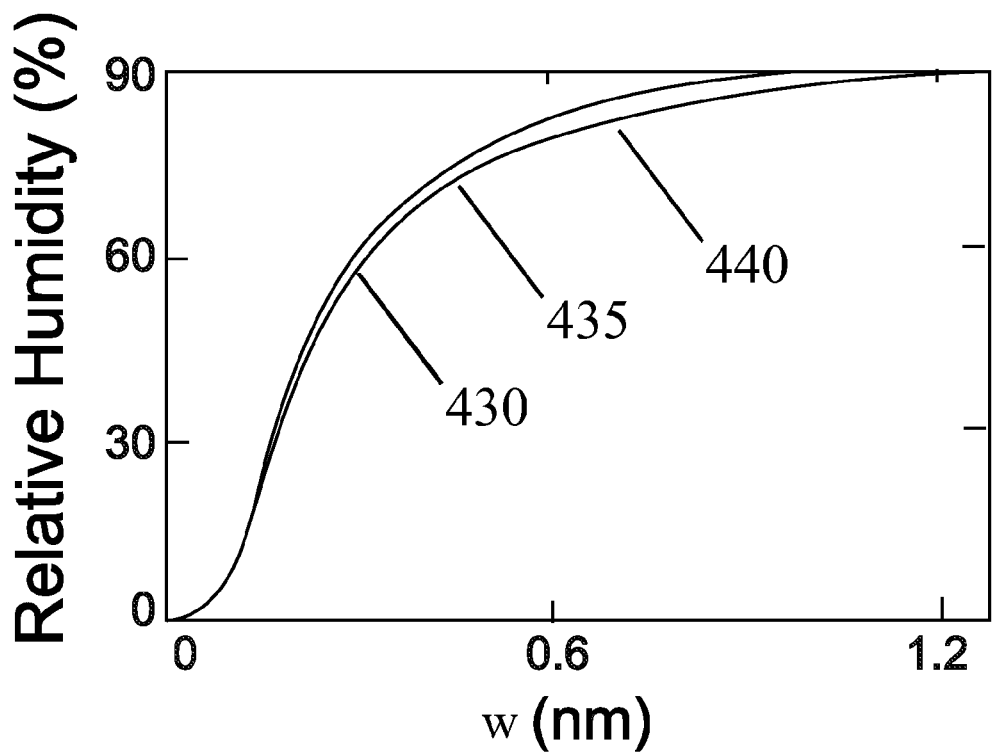
FIG. 5 is a graph of one embodiment of the method for etching a graphene nanostructure and shows the distance of a water film with respect to relative humidity levels.

FIG. 5 is a graph of one embodiment of the method for etching a graphene nanostructure and shows the distance of a water film with respect to relative humidity levels. As shown in FIG. 5, the graph illustrates the relative humidity with respect inner Helmholtz plane 430; outer Helmholtz plane 435; and diffusive region 440. When the HOPG 205 along with the DNA sample is placed in a humidity-controlled chamber, a film of water generally forms on the DNA sample, but does not generally form on the graphene surface. This typically occurs because the surface of the DNA sample is hydrophilic—i.e., interacts with water or other polar substances. The graphene surface, on the other hand, is generally hydrophic—i.e., does not interact with water. This thickness of the water film is generally given by the Branauer-Emmett-Teller (BET) model. For instance, according to FIG. 5, in one embodiment of the invention, as distance w increases, the relative humidity likewise increases up approximately to 50% at the inner Helmholtz plane 430, 70% at the outer Helmholtz plane 435, and 80% at the diffusive region 440. Distance w also increases at these regions at approximately 0.3 nm, 0.45 nm, and 0.65, respectively.

FIG. 6 is a graph of one embodiment of the method for etching a graphene nanostructure and shows the thickness of a water film with respect to the voltage potential. As shown in FIG. 6, the graph illustrates the voltage potential $\psi$ with respect to distance w, as it applies to the inner Helmholtz plane 445; outer Helmholtz plane 450; and diffusive region 455. As discussed above, as distance w increases, the voltage potential $\psi$ likewise increases up to the inner Helmholtz plane 445. This is typically due to the formation of immobilized positive ions at the negatively charged surface of the inner Helmholtz plane 445. However, voltage potential $\psi$ decreases outside the outer Helmholtz plane 450 and also at the diffusive region 455. This generally occurs because negatively charged ions assemble at the outer Helmholtz plane 450, which generally contribute to ionic conductance.

Unless otherwise stated, all measurements, values, ratings, positions, magnitudes, sizes, locations, and other specifications which are set forth in this specification, including in the claims which follow, are approximate, not exact. They are intended to have a reasonable range which is consistent with the functions to which they relate and with what is customary in the art to which they pertain. Additionally, the values set forth in this application may also depend greatly on the quality of the graphene being used with respect to the crystallites.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A method for etching a graphene nanostructure comprising:
   providing a piece of highly oriented pyrolytic graphite;
   wherein said piece of highly oriented pyrolytic graphite has a first window, a second window, and a third window;
   wherein said first window and said second window include one or more electrode contacts configured to receive an electrical voltage;
   wherein a portion of said third window includes a reaction area configured to receive a DNA sample, wherein said DNA sample comprises double-stranded DNA or single-stranded DNA;
   depositing said DNA sample to said reaction area;
   heating and melting said DNA sample;
   cooling said DNA sample to a room temperature;
   diluting said DNA sample with a buffer solution;
   applying said buffer solution containing said DNA sample to said reaction area;
   incubating said reaction area;
   rinsing said reaction area with a deionized water to remove said buffer solution and an excess of said DNA sample;
   placing said piece of highly oriented pyrolytic graphite in a humidity controlled chamber;
   applying a relative humidity to said piece of highly oriented pyrolytic graphite;
   applying said electrical voltage across said first window and said second window for approximately one to two minutes, thereby etching a surface of said highly oriented pyrolytic graphite; and
   rinsing said etched piece of highly oriented pyrolytic graphite in deionized water.

2. The method for etching a graphene nanostructure of claim 1, wherein said first window; said second window; and said third window are etched by a scanning electron microscope using an electron-beam lithography.

3. The method for etching a graphene nanostructure of claim 1, further comprising analyzing said first window, said second window, and said third window with an atomic force microscope.

4. The method for etching a graphene nanostructure of claim 1, wherein said first window and said second window are positioned approximately 600 to 1000 micrometers apart.

5. The method for etching a graphene nanostructure of claim 1, where said DNA sample is a double-stranded unmethylated lambda DNA.

6. The method for etching a graphene nanostructure of claim 1, wherein said heating and melting step is performed for approximately eight to twelve minutes at approximately 70 to 110° C.

7. The method for etching a graphene nanostructure of claim 1, wherein said buffer solution is approximately 0.5 to 1.5 molars of potassium chloride;
   approximately 8 to 12 millimolars of tris(hydroxymethyl) aminomethane hydrochloride; and
   approximately 8 to 12 millimolars of ethylenediaminetetraacetic acid.

8. The method for etching a graphene nanostructure of claim 1, wherein said applied relative humidity is approximately 60 to 90%.

9. A method for etching a graphene nanostructure comprising:
   providing a piece of highly oriented pyrolytic graphite coated with a polymethylmethacrylate resist having a first window, a second window, and a third window, wherein said first window and said second window include one or more electrode contacts configured to receive an electrical voltage, and wherein said first window and said second window are positioned approximately 600 to 1000 micrometers apart;
   wherein said first window; said second window; and said third window are etched by a scanning electron microscope using an electron-beam lithography;
   analyzing said first window, said second window, and said third window with an atomic force microscope;
   wherein a portion of said third window includes a reaction area configured to receive a double-stranded unmethylated lambda DNA;
   depositing said double-stranded unmethylated lambda DNA to said reaction area;
   heating and melting said double-stranded unmethylated lambda DNA for approximately eight to twelve minutes at approximately 70 to 110° C.;
   cooling said double-stranded unmethylated lambda DNA to a room temperature;
   diluting said double-stranded unmethylated lambda DNA with a buffer solution; wherein said buffer solution is approximately 0.5 to 1.5 molars of potassium chloride; 8 to 12 millimolars of tris(hydroxymethyl)aminomethane hydrochloride; and approximately 8 to 12 millimolars of ethylenediaminetetraacetic acid;
   applying said buffer solution to said reaction area;
   incubating said reaction area for approximately twenty to forty seconds;
   rinsing said reaction area with a deionized water to remove said buffer solution and an excess DNA;
   analyzing said third window with said atomic force microscope;
   placing said piece of highly oriented pyrolytic graphite in a humidity controlled chamber;
   applying a relative humidity of approximately 60 to 90% to said piece of highly oriented pyrolytic graphite;
   applying an electrical voltage gradient of approximately 2 to 6 V/mm across said first window and said second window for approximately one to two minutes, thereby etching a surface of said highly oriented pyrolytic graphite; and
   rinsing said piece of highly oriented pyrolytic graphite in deionized water.

* * * * *